(12) United States Patent
Beaver et al.

(10) Patent No.: US 9,760,414 B2
(45) Date of Patent: Sep. 12, 2017

(54) PRESERVING EVENT DATA FOR LAZILY-LOADED MACRO COMPONENTS IN A PUBLISH/SUBSCRIBE SYSTEM

(75) Inventors: Michael B. Beaver, Raleigh, NC (US); Jonathan D. Costello, Durham, NC (US); Jason R. Gary, Clermont, FL (US); Ravi Shah, Laveen, AZ (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 13/110,652

(22) Filed: May 18, 2011

(65) Prior Publication Data

US 2012/0296939 A1    Nov. 22, 2012

(51) Int. Cl.
    *G06F 9/00*     (2006.01)
    *G06F 17/00*    (2006.01)
    *G06F 17/30*    (2006.01)
    *G06F 9/54*     (2006.01)

(52) U.S. Cl.
    CPC .............. *G06F 9/546* (2013.01); *G06F 9/542* (2013.01); *G06F 17/30867* (2013.01)

(58) Field of Classification Search
    CPC ........................... G06F 9/546; G06F 17/30867
    USPC .................................................. 707/632, 636
    See application file for complete search history.

(56) References Cited

U.S. PATENT DOCUMENTS

| | | | |
|---|---|---|---|
| 6,052,740 A | 4/2000 | Frederick | |
| 6,690,391 B1 | 2/2004 | Proehl et al. | |
| 6,697,791 B2 | 2/2004 | Hellerstein et al. | |
| 6,799,286 B1 | 9/2004 | Evans et al. | |
| 6,986,134 B1 | 1/2006 | Foster | |
| 7,363,585 B1 | 4/2008 | Sierra et al. | |
| 7,500,250 B2 | 3/2009 | Mogilevsky et al. | |
| 7,565,425 B2 | 7/2009 | Van Vleet et al. | |
| 7,761,801 B2 | 7/2010 | Park | |
| 2007/0143502 A1* | 6/2007 | Garcia-Martin et al. | 709/246 |
| 2009/0210781 A1 | 8/2009 | Hagerott et al. | |
| 2010/0325565 A1 | 12/2010 | Skinner et al. | |
| 2011/0179020 A1* | 7/2011 | Ozzie et al. | 707/723 |

OTHER PUBLICATIONS

Office Action for U.S. Appl. No. 13/110,717 dated May 15, 2013.
(Continued)

*Primary Examiner* — Alexey Shmatov
(74) *Attorney, Agent, or Firm* — Robert A. Voigt, Jr.; Winstead, P.C.

(57) ABSTRACT

A method, system and computer program product for preserving event data for lazily-loaded macro components. Upon detecting an event published by a publisher, the logical channel of the detected event is identified. If one of the macro components to be lazily-loaded is a primary receiver for that logical channel (determined by performing a table-lookup of a data structure containing a listing of macro components and their associated logical channels for which they are to be the primary receivers), then the indication of the logical channel of the detected event along with the data of the published event are stored as a key/value pair in a data structure. Upon the macro component to be lazily-loaded having been loaded, the data of the published event associated with the logical channel for which the loaded macro component is a primary receiver is retrieved and transmitted to that logical channel.

12 Claims, 7 Drawing Sheets

(56) References Cited

OTHER PUBLICATIONS

Beaver et al., "Automatically Updating the Display State of the User Interface of a Client Device in a Publish/Subscribe System," , filed on May 18, 2011.
Office Action for U.S. Appl. No. 13/110,717 dated Oct. 24, 2013, pp. 1-26.

\* cited by examiner

PRESERVING EVENT DATA FOR LAZILY-LOADED MACRO COMPONENTS IN A PUBLISH/SUBSCRIBE SYSTEM

TECHNICAL FIELD

The present invention relates to publish/subscribe systems, and more particularly to preserving event data from publishers for lazily-loaded macro components.

BACKGROUND

A publish/subscribe system is an effective way of disseminating information from "publishers" to multiple users or "subscribers." A publisher generates messages, also referred to as events, which contain a topic and some data content. A subscriber, also referred to herein as a "client," provides, ahead of time, a criterion, also referred to as a subscription, that specifies the information, based on published messages, that the system is required to deliver to that subscriber client in the future. In a publish/subscribe system, publishers and subscribers are anonymous in that publishers do not necessarily know the number of subscribers or their locations; and subscribers do not necessarily know the locations of the publishers.

In the publish/subscribe system, subscribers typically receive only a subset of the total messages published. The messages may be selected for reception and processing using topic-based or content-based filtering. In a topic-based system, messages are published to "topics" or named logical channels. Subscribers in a topic-based system will receive all messages published to the topics to which they subscribe, and all subscribers to a topic will receive the same message. The publisher is responsible for defining the classes of messages to which subscribers can subscribe. The messages may be filtered using the subscription criterion which can be tested on each message independent of any other message. For example, a filtered published message might be "topic=Detroit Tigers & winning" for all messages related to the topic of the Detroit Tigers baseball team winning.

In a content-based system, messages are only delivered to a subscriber if the attributes or content of those messages match the constraints (subscription criterion) defined by the subscriber. The subscriber is responsible for classifying the messages.

In many publish/subscribe systems, publishers post messages to an intermediary message broker and subscribers register subscriptions with that broker, letting the broker perform the filtering.

Subscriber clients, including mobile computing clients, may use what are referred to as "macro components" in connection with the publish/subscribe system. A macro component is a bundle of components in a self-contained single object. Macro components in the context of a publish/subscribe system may be used to express events of interest to the message broker, provide the implementation to act upon those events of interest as well as provide the user interface components to convey the information of the event to the end user.

In certain computing environments, such as a mobile computing environment, it may be desirable to defer loading these macro components until the object is needed (referred to as "lazy loading") to increase the efficiency in the program's operation. However, the event of interest may be published prior to the corresponding macro component being loaded.

As a result, in order for the macro component to receive the event data, the event data may be re-propagated (i.e., the event is republished) after the macro component has been loaded. However, the republication of the event results in the other subscribers receiving the event again thereby causing confusion and repetition.

Alternatively, the broadcast of the event may be delayed until the macro component is loaded. However, by delaying the broadcast of the event, other subscribers will receive the event data at a later point in time.

Neither of these solutions are effective in providing the event data to lazily-loaded macro components without adversely affecting the other subscribers.

BRIEF SUMMARY

In one embodiment of the present invention, a method for preserving event data for lazily-loaded macro components comprises identifying a macro component to be lazily-loaded. The method further comprises storing an indication of the identified macro component to be lazily-loaded along with one or more indications of one or more logical channels the identified macro component is to be a primary receiver in a first data structure. Additionally, the method comprises detecting an event published by a publisher. In addition, the method comprises identifying a logical channel associated with the published event. Furthermore, the method comprises storing, by a processor, an indication of the logical channel associated with the published event and data of the published event as a key/value pair in a second data structure in response to the identified macro component being the primary receiver of the logical channel associated with the published event.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for preserving event data for lazily-loaded macro components. In one embodiment of the present invention, a macro component to be lazily-loaded is identified. An indication (e.g., identifier) of this macro component as well as an indication of the logical channel(s) the macro component is to be the primary receiver are stored in a data structure. Furthermore, the indication (e.g., identifier) of this macro component may be stored in another data structure that stores a collection of identifiers of macro components to be lazily-loaded. Upon detecting an event published by a publisher, the logical channel of the detected event is identified. A determination is made as to whether any of the macro components to be lazily-loaded is a primary receiver for the identified logical channel of the detected event by performing a table-lookup of the data structure containing a listing of macro components and their associated logical channels for which they are to be the primary receivers. If one of the macro components to be lazily-loaded is a primary receiver for the identified logical channel of the detected event, then the indication of the logical channel of the detected event along with the data of the published event are stored as a key/value pair in a further data structure. Upon one of these macro components (macro component to be lazily-loaded) being loaded, the data of the published event associated with the logical channel for which the loaded macro component is a primary receiver is retrieved and transmitted to that logical channel. By associating the event data with the targeted event channel in a data structure as well as associating the targeted event channel with the macro component to be lazily-loaded that is the primary receiver for that event channel in a data structure, event data can be received by the macro component at the time the macro component is loaded or initialized. In this manner, event data does not have to be re-propagated (i.e., the event does not have to be republished) and neither does the broadcast of the event have to be delayed.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
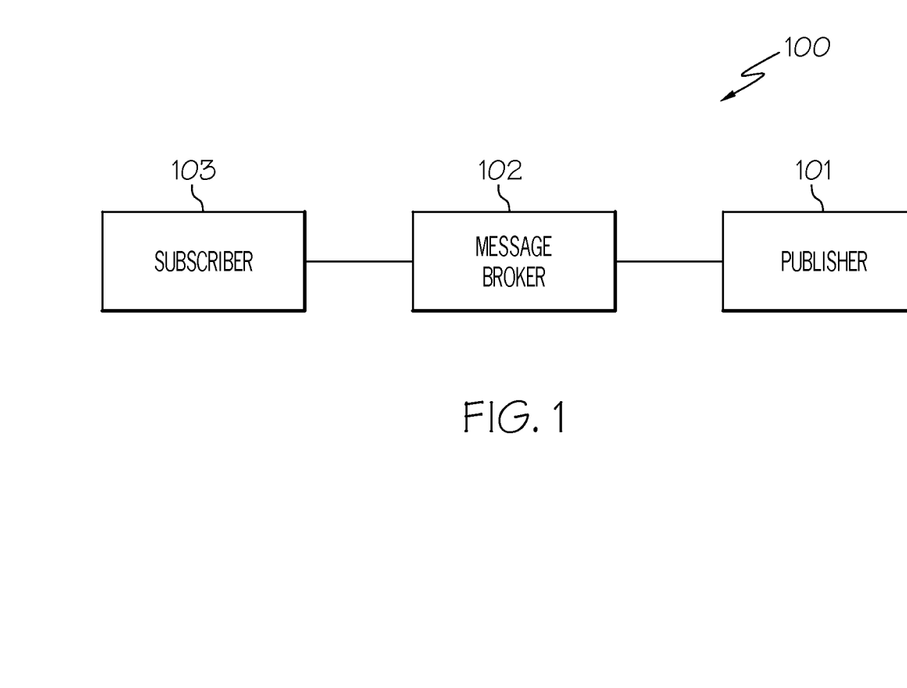
FIG. 1 illustrates one embodiment of the present invention of a publish/subscribe system.

Referring now to the Figures in detail, FIG. 1 illustrates a publish/subscribe system 100 for practicing the principles of the present invention in accordance with an embodiment of the present invention. Publish/subscribe system 100 includes a publisher 101 that generates messages, also referred to as events, which contain a topic and some data content. Publisher 101 does not attempt to deliver the messages to individual users but instead delivers them to a message broker 102. Message broker 102 acts as an intermediary between publisher 101 and individual subscribers, only one subscriber 103 (also referred to herein as a "client") being shown. Message broker 102 accepts subscriptions from individual subscribers 103 for future delivery of messages whose topic/content matches the subscription criterion.

Subscriber 103 may be any type of computing device (e.g., portable computing unit, personal digital assistant (PDA), smartphone, desktop computer system, workstation, Internet appliance and the like) configured with the capability of subscribing to receive messages from one or more publishers 101. A more detailed description of the hardware configuration of an illustrative subscriber 103 is provided below in connection with FIG. 2.

Referring again to FIG. 1, publisher 101 may be a computing device, such as a server, configured to generate messages of interest to subscribers.

While FIG. 1 illustrates a single publisher 101 and a single subscriber 103, publish/subscribe system 100 may include any number of publishers 101 and subscribers 103. Furthermore, publish/subscribe system 100 is not to be limited in scope to any one particular architecture. For example, message broker 102 may reside within subscriber 103 or publisher 101. Furthermore, subscriber 103 and publisher 101 may be interconnected via a network (not shown), such as a local area network or a wide area network.

Figure 2:
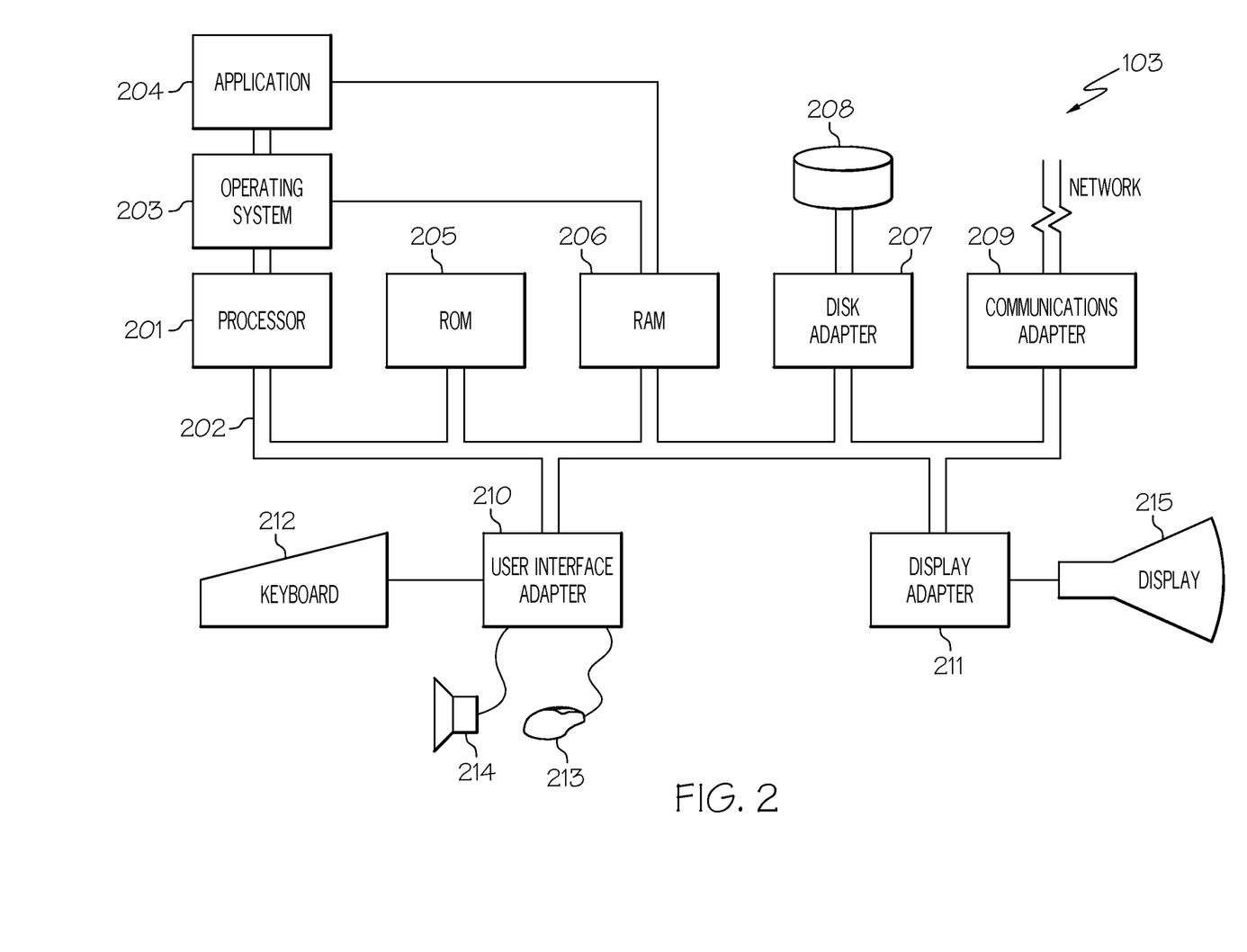
FIG. 2 is a hardware configuration of a subscriber in accordance with an embodiment of the present invention.

Referring now to FIG. 2, FIG. 2 illustrates a hardware configuration of subscriber 103 (FIG. 1) which is representative of a hardware environment for practicing the present invention. Referring to FIG. 2, subscriber 103 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for preserving event data for lazily-loaded macro components, as discussed further below in association with FIGS. 3-7.

Referring again to FIG. 2, read-only memory ("ROM") 205 is coupled to system bus 202 and includes a basic input/output system ("BIOS") that controls certain basic functions of subscriber 103. Random access memory ("RAM") 206 and disk adapter 207 are also coupled to system bus 202. It should be noted that software components including operating system 203 and application 204 may be loaded into RAM 206, which may be subscriber's 103 main memory for execution. Disk adapter 207 may be an integrated drive electronics ("IDE") adapter that communicates with a disk unit 208, e.g., disk drive. It is noted that the program for preserving event data for lazily-loaded macro components, as discussed further below in association with FIGS. 3-7, may reside in disk unit 208 or in application 204.

Subscriber 103 may further include a communications adapter 209 coupled to bus 202. Communications adapter 209 of subscriber 103 interconnects bus 202 with an outside network thereby enabling subscriber 103 to communicate with publisher 101.

I/O devices may also be connected to subscriber 103 via a user interface adapter 210 and a display adapter 211. Keyboard 212, mouse 213 and speaker 214 may all be interconnected to bus 202 through user interface adapter 210. Data may be inputted to subscriber 103 through any of these devices. A display monitor 215 may be connected to system bus 202 by display adapter 211. In this manner, a user is capable of inputting to subscriber 103 through keyboard 212 or mouse 213 and receiving output from subscriber 103 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, in certain computing environments, such as a mobile computing environment, it may be desirable to defer loading the macro components until the object is needed (referred to as "lazy loading") to increase the efficiency in the program's operation. However, in the context of a publish/subscribe system, the event of interest may be published prior to the corresponding macro component being loaded. As a result, in order for the macro component to receive the event data, the event data may be re-propagated (i.e., the event is republished) after the macro component has been loaded. However, the republication of the event results in the other subscribers receiving the event again thereby causing confusion and repetition. Alternatively, the broadcast of the event may be delayed until the macro component is loaded. However, by delaying the broadcast of the event, other subscribers will receive the event data at a later point in time. Neither of these solutions are effective in providing the event data to lazily-loaded macro components without adversely affecting the other subscribers.

Figure 3:
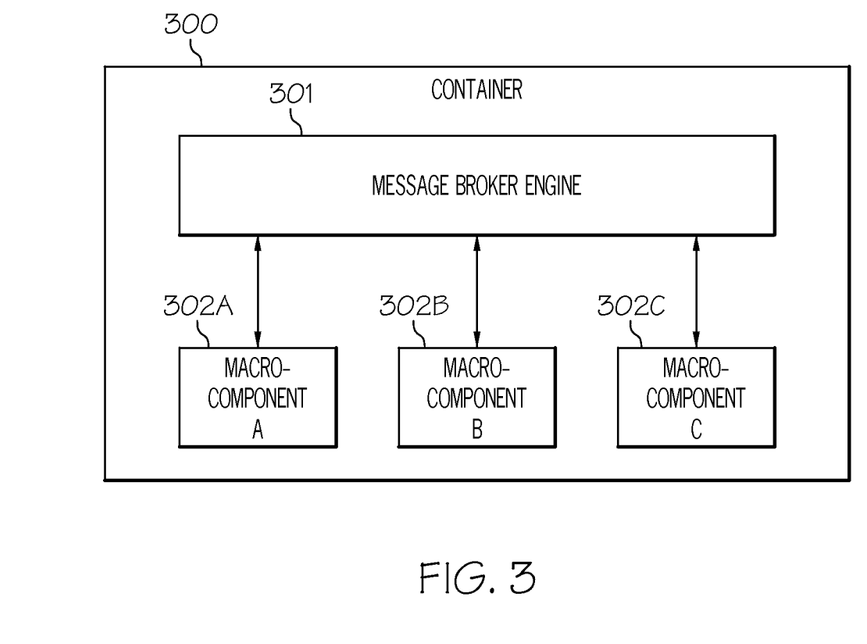
FIG. 3 illustrates the software components of the subscriber used in connection with preserving the event data for lazily-loaded macro components without adversely affecting the other subscribers in accordance with an embodiment of the present invention.
Figure 4:
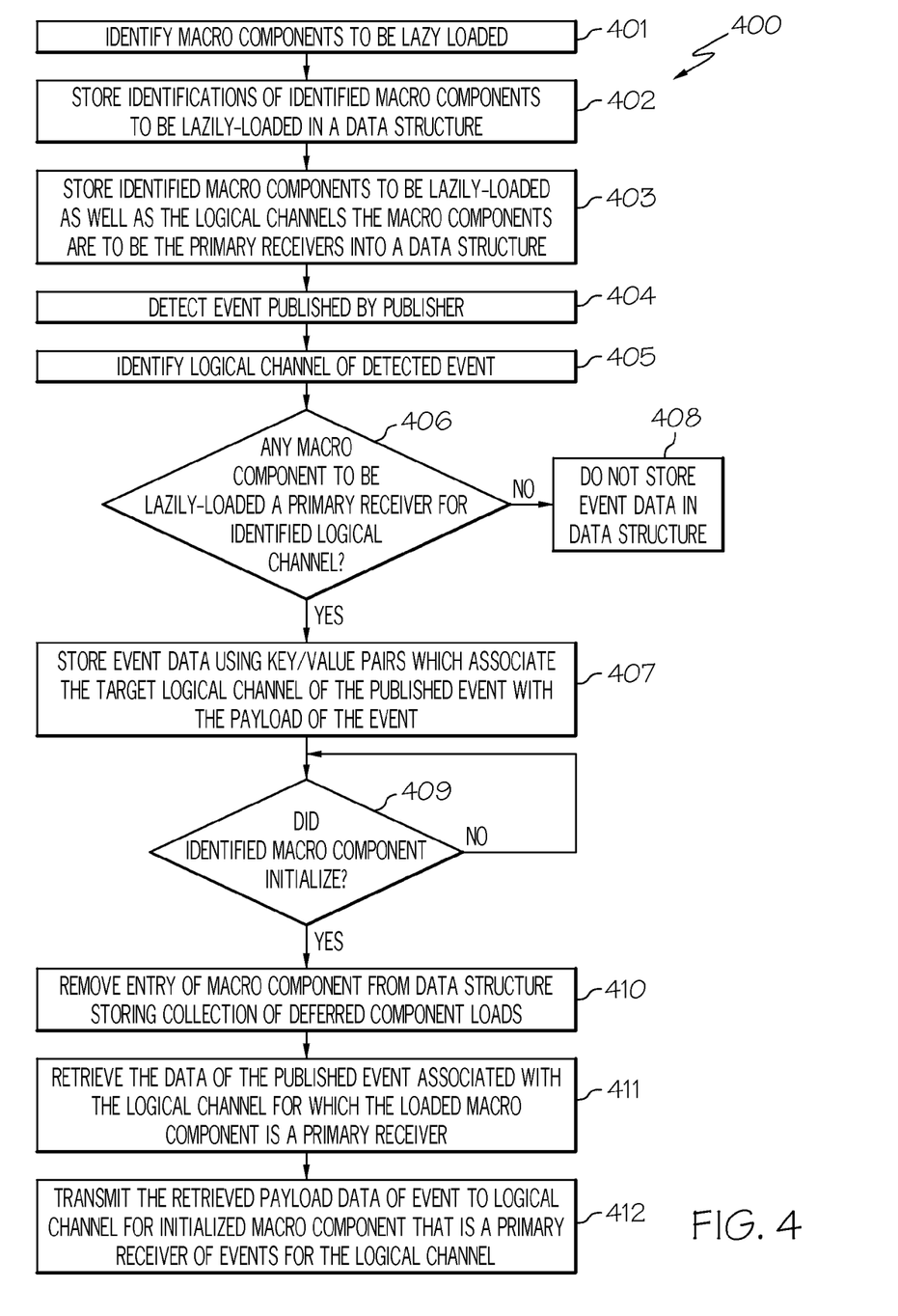
FIG. 4 is a flowchart of a method for preserving the event data for lazily-loaded macro components without adversely affecting the other subscribers in accordance with an embodiment of the present invention.
Figure 5:
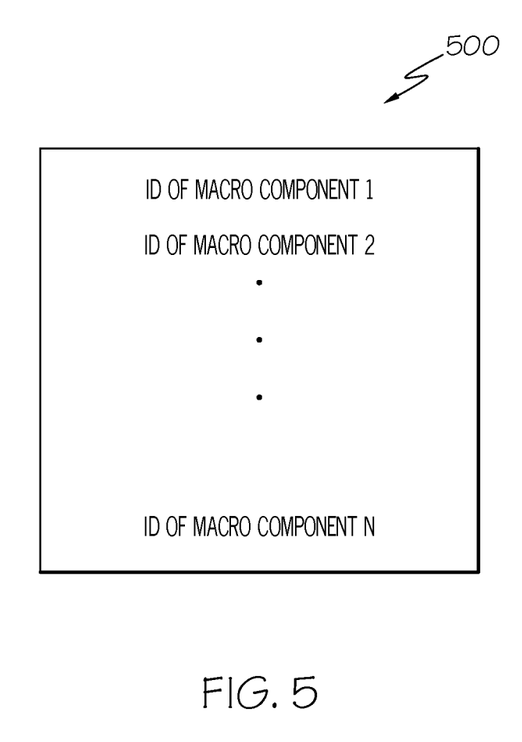
FIG. 5 is a data structure for storing a collection of indications of macro components to be lazily-loaded in accordance with an embodiment of the present invention.
Figure 6:
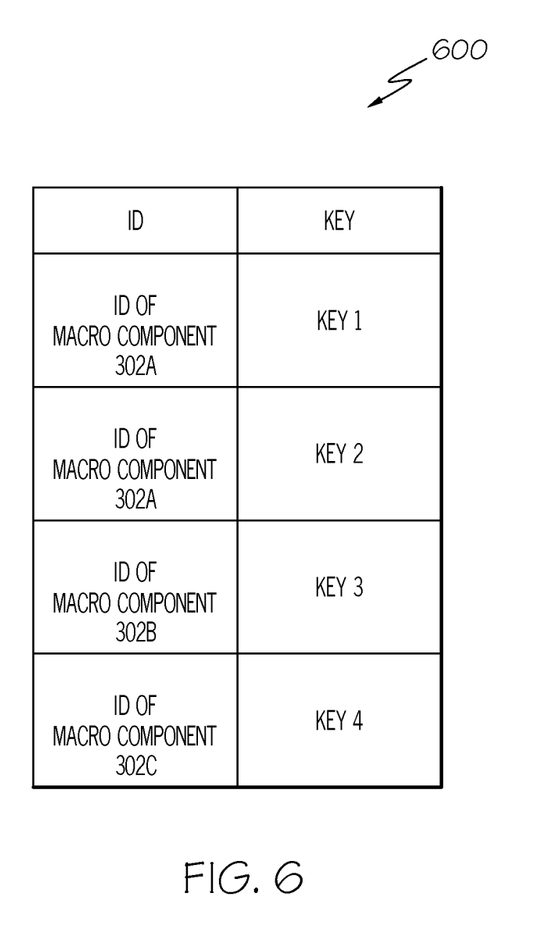
FIG. 6 is a data structure for storing indications of macro components that are to be lazily-loaded as well as storing the logical channels the macro components are to be the primary receivers in accordance with an embodiment of the present invention.
Figure 7:
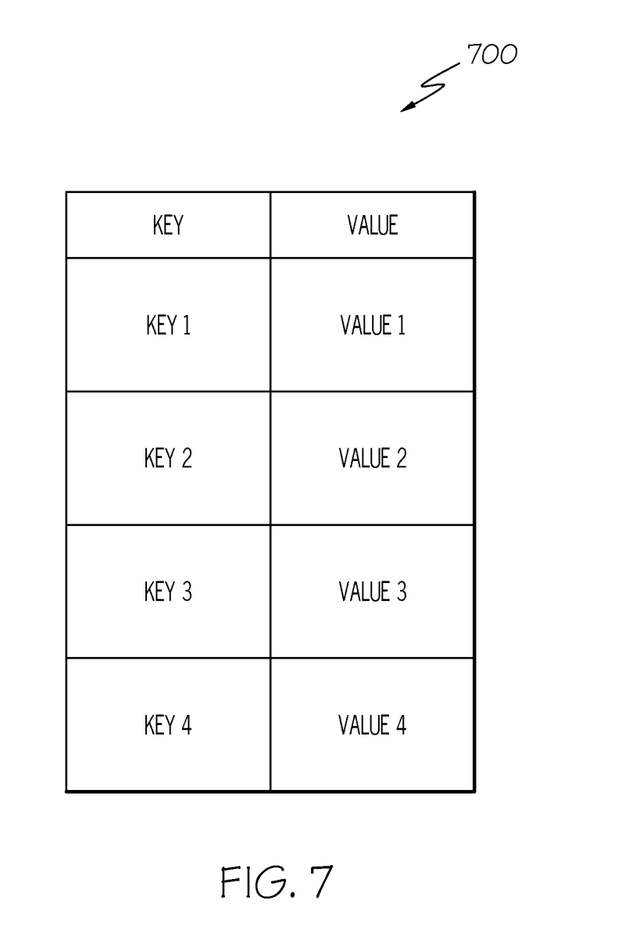
FIG. 7 is a data structure for storing indications of the logical channels as well as the payloads of the published events for the logical channels as a key/value pair in accordance with an embodiment of the present invention.

The principles of the present invention provide a means for providing the event data to lazily-loaded macro components without adversely affecting the other subscribers as discussed below in connection with FIGS. 3-7. FIG. 3 illustrates the software components of subscriber 103 (FIGS. 1 and 2) used in connection with providing the event data to lazily-loaded macro components without adversely affecting the other subscribers. FIG. 4 is a flowchart of a method for providing the event data to lazily-loaded macro components without adversely affecting the other subscribers. FIG. 5 illustrates a data structure for storing indications of macro components that are to be lazily-loaded. FIG. 6 illustrates a data structure for storing indications of macro components that are to be lazily-loaded along with the indications of the associated logical channels they are to be the primary receivers. FIG. 7 illustrates a data structure for storing the indications of the logical channels and event data as key/value pairs for cases where those logical channels are associated with a macro component to be lazily-loaded.

Referring to FIG. 3, as stated above, FIG. 3 illustrates the software components of subscriber 103 (FIGS. 1 and 2) used in connection with providing the event data to lazily-loaded macro components without adversely affecting the other subscribers in accordance with an embodiment of the present invention. In one embodiment, these software components are the components of the program for providing the event data to lazily-loaded macro components without adversely affecting the other subscribers, where the program may reside in application 204 (FIG. 2).

The following provides a brief description of these software components. A more detailed description of these software components is provided below in conjunction with FIGS. 4-7.

Referring again to FIG. 3, a container 300 may include a message broker engine 301. Message broker engine 301 may include all or a portion of the functionality of message broker 102 depicted in FIG. 1. Container 300 further includes macro components 302A-302C configured to communicate with message broker engine 301. Macro components 302A-302C may collectively or individually be referred to as macro components 302 or macro component 302, respectively. Container 300 may include any number of macro components 302.

Each macro component 302 is a bundle of components in a self-contained object. In the context of the publish/subscribe system, each macro component 302 may be used to express events of interest to message broker engine 301, provide the implementation to act upon those events of interest as well as provide the user interface components to convey the information of the event to the end user.

A description of the functionality of message broker 301 is discussed below in connection with FIG. 4.

FIG. 4 is a flowchart of a method 400 for providing the event data to lazily-loaded macro components 302 (FIG. 3) without adversely affecting the other subscribers in accordance with an embodiment of the present invention.

Referring to FIG. 4, in conjunction with FIGS. 1-3, in step 401, message broker engine 301 identifies the macro components 302 that are to be lazily-loaded. In one embodiment, during initialization of container 300, message broker engine 301 inspects and captures the component definitions for each of the macro components 302. In one embodiment, a component definition may include an identifier of the component, the storage location of the component, an indication as to whether the component is to be lazily-loaded as well as which logical channels the component is to be the primary receiver. A macro component may be deemed to be the primary receiver if the macro component is the primary display component for the targeted event/logical channel. That is, a macro component may be deemed to be the primary receiver if the macro component is to be the primary recipient of the data from the published event.

In step 402, using the information acquired in step 401, message broker engine 301 stores indications (e.g., identifiers) of the identified macro components 302 that are to be lazily-loaded into a data structure storing a collection of identifications of macro components to be lazily-loaded as illustrated in FIG. 5.

Referring to FIG. 5, FIG. 5 illustrates a data structure 500 for storing indications of macro components 302 that are to be lazily-loaded in accordance with an embodiment of the present invention. For example, data structure 500 stores the identifiers (represented by "ID") of macro components 302 labeled 1 to N, where N may be any positive integer. In one embodiment, data structure 500 resides in the memory (e.g., memory 206), disk unit 208 or cache (not shown in FIG. 2) (e.g., CPU cache, disk cache) of subscriber 103. Data structure 500 may store indications for any number of macro components 302 and data structure 500 is not to be limited in scope to the depiction of FIG. 5.

Returning to FIG. 4, in step 403, using the information acquired in step 401, message broker engine 301 stores indications (e.g., identifiers) of the identified macro components 302 that are to be lazily-loaded as well as the logical channels the macro components 302 are to be the primary receivers into a data structure as illustrated in FIG. 6.

Referring to FIG. 6, FIG. 6 illustrates a data structure 600 for storing indications of macro components 302 that are to be lazily-loaded as well as the indications of the logical channels the macro components 302 are to be the primary receivers in accordance with an embodiment of the present invention. For example, data structure 600 stores the identifiers (represented by "ID") of macro components 302A-302C along with the identifications (represented by a "key") of the logical channels they are to be the primary receivers. In one embodiment, the logical channels may be represented as a "key," where each macro component 302 may be deemed to be the primary receiver of one or more logical channels represented by one or more keys. For instance, referring to FIG. 6, macro component 302A is deemed to be the primary receiver for the logical channels represented by "key 1" and "key 2." Macro component 302B is deemed to be the primary receiver for the logical channel represented by "key 3." Furthermore, macro component 302C is deemed to be the primary receiver for the logical channel represented by "key 4." In one embodiment, data structure 600 resides in the memory (e.g., memory 206), disk unit 208 or cache (not shown in FIG. 2) (e.g., CPU cache, disk cache) of subscriber 103. Data structure 600 may store any number of identifiers and keys and data structure 600 is not to be limited in scope to the depiction of FIG. 6.

In one embodiment, message broker engine 301 only uses data structure 600 to store the information acquired in step 401. That is, in one embodiment, step 402 of method 400 may be omitted.

Returning to FIG. 4, in step 404, message broker engine 301 detects an event published by a publisher 101.

In step 405, message broker engine 301 identifies the logical channel of the detected event.

In step 406, message broker engine 301 determines whether any of the macro components 302 to be lazily-loaded are a primary receiver for the identified logical channel of the detected event. In one embodiment, message broker engine 301 performs a table-lookup of data structure 600 (FIG. 6) to identify any macro components 302 associated with the logical channel (represented by a key in data structure 600) of the detected event.

If message broker engine 301 identifies a macro component 302 to be lazily-loaded as being the primary receiver of the logical channel associated with the published event, then, in step 407, message broker engine 301 stores an indication of the logical channel associated with the published event as well as the payload of the published event (data of the published event) as a key/value pair in a data structure as illustrated in FIG. 7.

Referring to FIG. 7, FIG. 7 illustrates a data structure 700 for storing indications of the logical channels as well as the payloads of the published events for the logical channels as a key/value pair in accordance with an embodiment of the present invention. For example, data structure 700 stores the logical channels represented by keys (labeled as "key 1," "key 2," "key 3" and "key 4" in FIG. 7). Each logical channel is associated with payload or event data to be published in that logical channel. For instance, the logical channel represented by "key 1" is associated with data represented by "value 1" in data structure 700. Similarly, the logical channel represented by "key 2" is associated with data represented by "value 2" in data structure 700. Furthermore, the logical channel represented by "key 3" is associated with data represented by "value 3" in data structure 700. Additionally, the logical channel represented by "key 4" is associated with data represented by "value 4" in data structure 700. In one embodiment, data structure 700 resides in the memory (e.g., memory 206), disk unit 208 or cache (not shown in FIG. 2) (e.g., CPU cache, disk cache) of subscriber 103. Data structure 700 may store any number of key/value pairs and data structure 700 is not to be limited in scope to the depiction of FIG. 7.

By associating the event data with the targeted event channel in data structure 700 as well as associating the targeted event channel with the macro component 302 to be lazily-loaded that is the primary receiver for that event channel in data structure 600, event data can be received by macro component 302 at the time macro component 302 is loaded or initialized. In this manner, event data does not have to be re-propagated (i.e., the event does not have to be republished) and neither does the broadcast of the event have to be delayed.

Returning to FIG. 4, if, however, message broker engine 301 does not identify a macro component 302 to be lazily-loaded as being the primary receiver of the logical channel associated with the published event, then, in step 408, message broker engine 301 does not store the event data in data structure 700.

Returning to step 407, upon storing an indication of the logical channel associated with the published event as well as the payload of the published event (data of the published event) as a key/value pair in data structure 700, in step 409, message broker engine 301 determines whether any of the macro components 302 identified in step 401 to be lazily-loaded have been loaded.

If none of the macro components 302 identified in step 401 to be lazily-loaded have been loaded, then, message broker engine 301 continues to determine in step 409 if any of the components 302 identified in step 401 to be lazily-loaded have been loaded.

If one of the macro components 302 identified in step 401 has been loaded, then, in step 410, message broker engine 301 removes the entry of macro component 302 from data structure 500 storing a collection of deferred component loads. Alternatively, message broker engine 301 transmits an indication to container 300 indicating that macro component 302 identified in step 401 has been loaded and to perform the appropriate action according to the current policy. Furthermore, in another embodiment, step 410 may be omitted (i.e., the entry of macro component 302 identified in step 401 that has been loaded may not be removed from data structure 500).

In step 411, message broker engine 301 retrieves the payload data (data of the published event) associated with the logical channel for which the loaded macro component is a primary receiver from data structure 700. In one embodiment, message broker engine 301 identifies the logical channel for which the loaded macro component is a primary receiver from data structure 600. Once the key for this logical channel is obtained, message broker engine 301 obtains the data of the published event associated with this logical channel as a key/value pair from data structure 700. For example, if macro component 302B, which was to be lazily-loaded, became loaded, then message broker engine 301 could retrieve the logical channel(s) for which macro component 302B is the primary receiver from data structure 600. As shown in FIG. 6, macro component 302B is the primary receiver for the logical channel identified by "key 3." Message broker engine 301 may then retrieve the data of the published event (identified by "value 3") associated with the logical channel identified by "key 3" from data structure 700.

In step 412, message broker engine 301 transmits the retrieved payload data (data of the published event) to its associated logical channel for the initialized macro component 302 that is the primary receiver of events for the logical channel.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for preserving event data for lazily-loaded macro components, the method comprising:
   inspecting and capturing a component definition for each of a plurality of macro components, wherein said component definition comprises an identifier of a macro component, a storage location of said macro component, an indication as to whether said macro component is to be lazily-loaded and identification of one or more logical channels for which said macro component is to be a primary receiver, wherein said macro component is configured to express events of interest to a message broker, provide an implementation to act upon said events of interest as well as provide user interface components to convey information of an event to an end user, wherein said macro component is a bundle of components in a self-contained single object, wherein said lazy loading defers loading said macro component until said object is needed, wherein said macro component is deemed to be said primary receiver in response to said macro component being a primary display component for a targeted logical channel;
   identifying macro components to be lazily-loaded based on said captured component definitions;
   storing identifiers of said macro components identified to be lazily-loaded in a third data structure;
   storing said identifiers of said macro components identified to be lazily-loaded along with identifications of logical channels for which said macro components identified to be lazily-loaded are to be primary receivers in a first data structure, wherein each of said identifications of said logical channels for which a macro component is to be said primary receiver is represented by a key in said first data structure, wherein said key is associated with a particular macro component;

detecting an event published by a publisher;

identifying a logical channel associated with said published event;

storing, by a processor, an identifier of said logical channel associated with said published event and data of said published event as a key/value pair in a second data structure in response to identifying a macro component out of said macro components identified to be lazily-loaded being a primary receiver for said identified logical channel of said detected event determining whether said macro component identified as being said primary receiver for said identified logical channel of said detected event loaded; and removing an entry of said macro component identified as being said primary receiver for said identified logical channel of said detected event from said third data structure in response to said macro component being loaded.

2. The method as recited in claim 1 further comprising:
retrieving said data of said published event from said second data structure in response to said macro component being loaded.

3. The method as recited in claim 2 further comprising:
transmitting said retrieved data of said published event to said identified logical channel for said loaded macro component.

4. The method as recited in claim 2 further comprising:
obtaining a key for said identified logical channel from said first data structure; and
obtaining said data of said published event associated with said identified logical channel as a key/value pair from said second data structure.

5. A computer program product embodied in a computer readable storage memory for preserving event data for lazily-loaded macro components, the computer program product comprising the programming instructions for:
inspecting and capturing a component definition for each of a plurality of macro components, wherein said component definition comprises an identifier of a macro component, a storage location of said macro component, an indication as to whether said macro component is to be lazily-loaded and identification of one or more logical channels for which said macro component is to be a primary receiver, wherein said macro component is configured to express events of interest to a message broker, provide an implementation to act upon said events of interest as well as provide user interface components to convey information of an event to an end user, wherein said macro component is a bundle of components in a self-contained single object, wherein said lazy loading defers loading said macro component until said object is needed, wherein said macro component is deemed to be said primary receiver in response to said macro component being a primary display component for a targeted logical channel;

identifying macro components to be lazily-loaded based on said captured component definitions;

storing identifiers of said macro components identified to be lazily-loaded in a third data structure;

storing said identifiers of said macro components identified to be lazily-loaded along with identifications of logical channels for which said macro components identified to be lazily-loaded are to be primary receivers in a first data structure, wherein each of said identifications of said logical channels for which a macro component is to be said primary receiver is represented by a key in said first data structure, wherein said key is associated with a particular macro component;

detecting an event published by a publisher;

identifying a logical channel associated with said published event;

storing an identifier of said logical channel associated with said published event and data of said published event as a key/value pair in a second data structure in response to identifying a macro component out of said macro components identified to be lazily-loaded being a primary receiver for said identified logical channel of said detected event determining whether said macro component identified as being said primary receiver for said identified logical channel of said detected event loaded; and removing an entry of said macro component identified as being said primary receiver for said identified logical channel of said detected event from said third data structure in response to said macro component being loaded.

6. The computer program product as recited in claim 5 further comprising the programming instructions for:
retrieving said data of said published event from said second data structure in response to said macro component being loaded.

7. The computer program product as recited in claim 6 further comprising the programming instructions for:
transmitting said retrieved data of said published event to said identified logical channel for said loaded macro component.

8. The computer program product as recited in claim 6 further comprising:
obtaining a key for said identified logical channel from said first data structure; and
obtaining said data of said published event associated with said identified logical channel as a key/value pair from said second data structure.

9. A system, comprising:
a memory unit for storing a computer program for preserving event data for lazily-loaded macro components; and
a processor coupled to said memory unit, wherein said processor is configured to execute the program instructions of the computer program comprising:
inspecting and capturing a component definition for each of a plurality of macro components, wherein said component definition comprises an identifier of a macro component, a storage location of said macro component, an indication as to whether said macro component is to be lazily-loaded and identification of one or more logical channels for which said macro component is to be a primary receiver, wherein said macro component is configured to express events of interest to a message broker, provide an implementation to act upon said events of interest as well as provide user interface components to convey information of an event to an end user, wherein said macro component is a bundle of components in a self-contained single object, wherein said lazy loading defers loading said macro component until said object is needed, wherein said macro component is deemed to be said primary receiver in response to said macro component being a primary display component for a targeted logical channel;

identifying macro components to be lazily-loaded based on said captured component definitions;

storing identifiers of said macro components identified to be lazily-loaded in a third data structure;

storing said identifiers of said macro components identified to be lazily-loaded along with identifications of logical channels for which said macro components identified to be lazily-loaded are to be primary receivers in a first data structure, wherein each of said identifications of said logical channels for which a macro component is to be said primary receiver is represented by a key in said first data structure, wherein said key is associated with a particular macro component;

detecting an event published by a publisher;

identifying a logical channel associated with said published event;

storing an identifier of said logical channel associated with said published event and data of said published event as a key/value pair in a second data structure in response to identifying a macro component out of said macro components identified to be lazily-loaded being a primary receiver for said identified logical channel of said detected event determining whether said macro component identified as being said primary receiver for said identified logical channel of said detected event loaded; and removing an entry of said macro component identified as being said primary receiver for said identified logical channel of said detected event from said third data structure in response to said macro component being loaded.

10. The system as recited in claim 9, wherein the program instructions of the computer program further comprise:

retrieving said data of said published event from said second data structure in response to said macro component being loaded.

11. The system as recited in claim 10, wherein the program instructions of the computer program further comprise:

transmitting said retrieved data of said published event to said identified logical channel for said loaded macro component.

12. The system as recited in claim 10, wherein the program instructions of the computer program further comprise:

obtaining a key for said identified logical channel from said first data structure; and obtaining said data of said published event associated with said identified logical channel as a key/value pair from said second data structure.

\* \* \* \* \*